United States Patent [19]
Ohtagaki et al.

[11] Patent Number: 5,375,872
[45] Date of Patent: Dec. 27, 1994

[54] SUSPENSION CONTROL DEVICE

[75] Inventors: Shigeki Ohtagaki; Kazunori Miura, both of Hyogo, Japan

[73] Assignee: Mitsubishi Denki Kabushiki Kaisha, Tokyo, Japan

[21] Appl. No.: 883,489

[22] Filed: May 15, 1992

[30] Foreign Application Priority Data

May 17, 1991 [JP] Japan ................. 3-112703

[51] Int. Cl.$^5$ .......................................... B60G 17/015
[52] U.S. Cl. ................. 280/707; 364/424.05
[58] Field of Search .............. 280/707; 364/424.05

[56] References Cited

U.S. PATENT DOCUMENTS

| | | | |
|---|---|---|---|
| 4,696,489 | 9/1987 | Fujishiro et al. | 280/707 |
| 5,015,007 | 5/1991 | Uchiyama et al. | 280/707 |
| 5,101,355 | 3/1992 | Wada et al. | 280/707 X |
| 5,138,554 | 8/1992 | Wada | 280/707 X |
| 5,163,704 | 11/1992 | Wada | 280/707 X |
| 5,173,858 | 12/1992 | Wada et al. | 280/707 X |
| 5,175,687 | 12/1992 | Tsutsumi et al. | 280/707 X |
| 5,189,614 | 2/1993 | Mitsuoka et al. | 280/707 X |

FOREIGN PATENT DOCUMENTS

| | | |
|---|---|---|
| 61-166715 | 7/1986 | Japan . |
| 3189218 | 8/1991 | Japan ................. 280/707 |

Primary Examiner—Eric D. Culbreth
Assistant Examiner—Peter English
Attorney, Agent, or Firm—Sughrue, Mion, Zinn, Macpeak & Seas

[57] ABSTRACT

In a suspension control device, vertical acceleration detecting means detects an acceleration of a vehicle body in a vertical direction. A spring constant and damping force changing means for the suspensions of the vehicle body is provided. A vertical acceleration differential value measuring means measures the differential value of an output signal of the vertical acceleration detecting means which is larger than a predetermined level. A vertical acceleration period measuring means measures the magnitude and period of vibration of the output signal of the vertical acceleration detecting means. A first damping force and spring constant holding and setting means estimates a frequency of vibration of the vehicle body from the output signal of the vertical acceleration differential value measuring means, operating on the frequency thus estimated. A second damping force and spring constant holding and setting means operates on the frequency of vibration of the vehicle body which is obtained from the output signal of the vertical acceleration period measuring means. A spring constant and damping force changing control unit which, in accordance with the outputs of the first and second damping force and spring constant holding and setting means, changes the outputs of the spring constant and damping force changing means to desired levels simultaneously for the front and rear wheels, and maintains the outputs thus changed for a predetermined period of time.

4 Claims, 7 Drawing Sheets

SUSPENSION CONTROL DEVICE

BACKGROUND OF THE INVENTION

This invention relates to a suspension control device in a vehicle, and more particularly to a suspension control device which is effective in suppressing shocks applied intermittently to a vehicle traveling on a road by the unevenness of the road, and the vibration of the vehicle following a shock.

A suspension control device has been disclosed, for instance, by Japanese Patent Application (OPI) No. 166715/1986 (the term "OPI" as used herein means an "unexamined published application"). The conventional suspension control device, as shown in FIG. 8, comprises: front wheel acceleration detecting means M2 for detecting an acceleration in a direction perpendicular to the road surface which is applied to the front wheels M1 of the vehicle; decision means M3 for deciding whether or not an acceleration detected by the front wheel acceleration detecting means M2 is out of a predetermined range; and rear wheel suspension characteristic changing means M5 for changing the suspension characteristic of the rear wheels M4 when the decision means M3 has decided that the acceleration is out of the predetermined range.

In the suspension control device thus designed, the front wheel acceleration detecting means M2 detects an acceleration in a direction perpendicular to the road surface, and the decision means M3 decides a degree of unevenness of the road surface corresponding to the acceleration thus detected. The result of decision is applied to the rear wheel suspension characteristic changing means M5. When the degree of unevenness of the road surface is larger than a predetermined value, the rear wheel suspension characteristic changing means M5 operates to suppress the vibration of the rear wheels M4, or to ensure the controllability and stability for the vehicle body.

The above-described conventional suspension control device employs a system such that the changing of the suspension characteristics are performed based on a moving of the front wheels and the vertical acceleration, and the passing timing of the rear wheels over the obstruction is determined from the detection of the vehicle speed, to restore the suspension characteristics. Therefore, the conventional suspension control device suffers from a problem that the changing of the characteristics may be performed independently of the vibration of the vehicle body, this results in an unreliability of the control. In the case where obstructions appear periodically such as the seams of the road surfaces of a highway, the suspensions must be controlled frequently in synchronization with the appearance of the seams of the road surfaces irrespective of the vibration of the vehicle body. If the seams of the road surfaces are not positively detected, then it is difficult to effectively suppress the resonance of the vehicle body and to lessen the shocks given to it by the road surface.

Furthermore, in the case where obstructions appear frequently, even when the vehicle body suffers from resonance, there is no time to control the damping force and to make the suspension setting hard. In addition, it cannot be determined without fail only from signals stemming from obstructions that harmful vibrations will occur.

SUMMARY OF THE INVENTION

Accordingly, an object of this invention is to eliminate the above-described difficulties accompanying a conventional vehicle suspension control device.

More specifically, an object of the invention is to provide a vehicle suspension control device which effectively suppresses the resonance of a vehicle body, and lessens the shock given by the road surfaces.

The foregoing object and other objects of the invention have been achieved by the provision of a suspension control device which, according to the invention, comprises:

vertical acceleration detecting means for detecting an acceleration of a vehicle body in a vertical direction;

spring constant and damping force changing means for changing at least one of the spring constant and damping force of each suspension of the vehicle body in at least three steps simultaneously for both front and rear wheels;

vertical acceleration differential value measuring means for measuring the differential value of an output signal of the vertical acceleration detecting means which is larger than a predetermined level;

vertical acceleration period measuring means for measuring a magnitude and period of vibration of an output signal of the vertical acceleration detecting means;

first damping force and spring constant holding and setting means for estimating a frequency of vibration of the vehicle body from an output signal of the vertical acceleration differential value measuring means, operating on the frequency thus estimated;

second damping force and spring constant holding and setting means operating on a frequency of vibration of the vehicle body which is obtained from an output signal of the vertical acceleration period measuring means; and a spring constant and damping force changing control unit which, in accordance with outputs of the first and second damping force and spring constant holding and setting means, changes outputs of the spring constant and damping force changing means to desired levels simultaneously for the front and rear wheels, and maintains the outputs thus changed for a predetermined period of time.

In order to suitably suppress a great shock or a great posture change initially given to a vehicle body when the latter moves over a large protrusion, the vehicle body vibration suppressing control should be improved in response characteristic. For this purpose, according to the differential value of the output signal of the vertical acceleration detecting means which is higher than the predetermined level, the spring constants or damping forces for both the front and rear wheels are increased to desired levels simultaneously and held for a predetermined period of time, with the results that the vehicle body is improved both in controllability and in stability, and, when the wheels land on the ground, the suspensions are prevented from bottoming out.

On the other hand, the period of vertical vibration of the vehicle is measured. When the unwanted vibration of the vehicle body is detected, the spring constants or damping forces for both the front and rear wheels are changed to desired levels simultaneously, and held for a predetermined period of time, so as to suppress the vertical vibration of the vehicle body.

The nature, utility and principle of the invention will be more clearly understood from the following detailed description and the appended claim when read in conjunction with the accompanying drawing(s).

DETAILED DESCRIPTION OF THE INVENTION

One preferred embodiment of this invention will be described with reference to the accompanying drawings.

Figure 1:
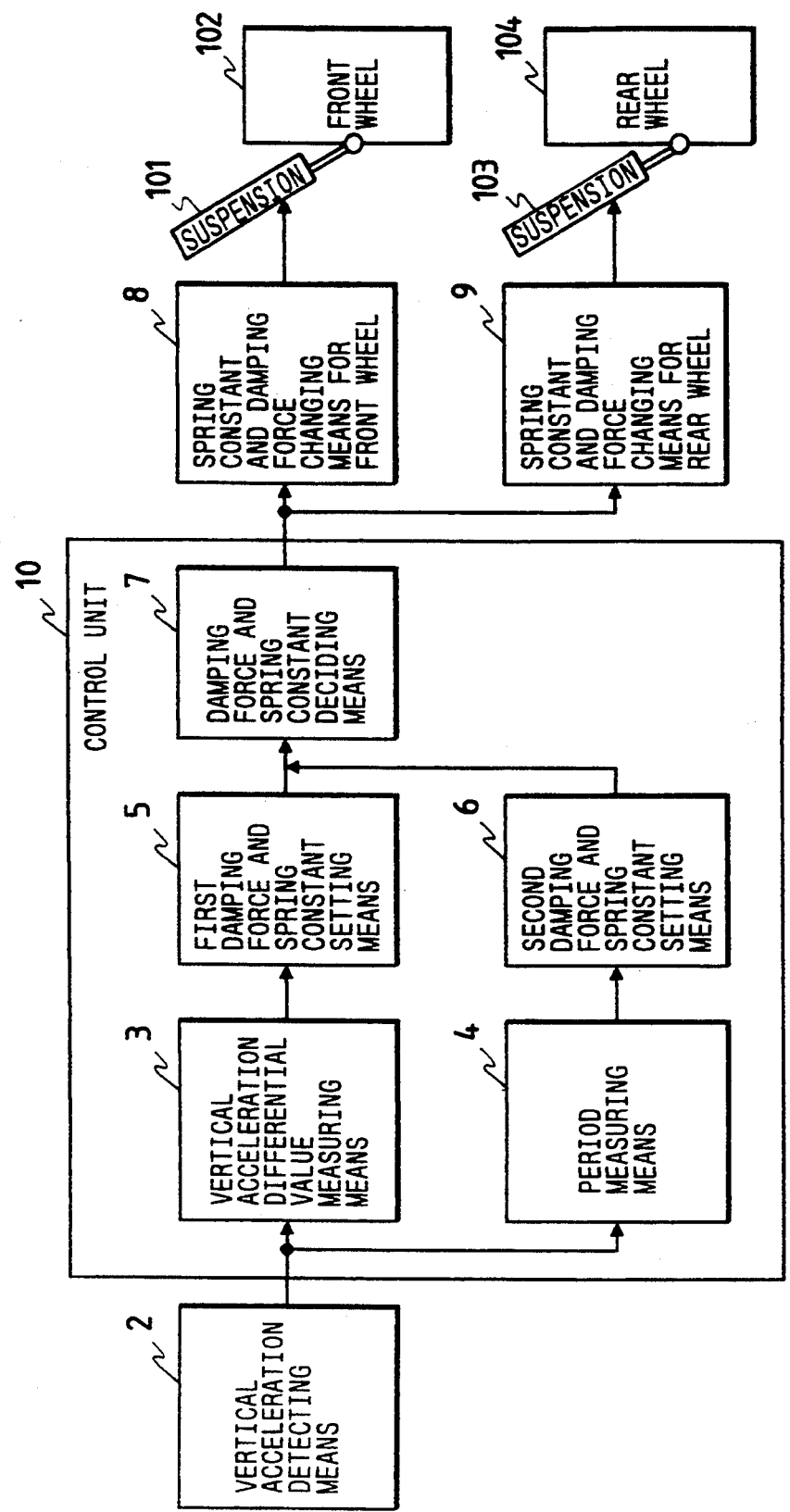
FIG. 1 is a block diagram showing the arrangement of an example of a suspension control device according to this invention.

A suspension control device according to the invention, as shown in FIG. 1, comprises: acceleration detecting means 2 for detecting an acceleration of a vehicle body in a vertical direction; a front wheel shock absorbing unit 101 arranged between each front wheel 102 and the vehicle body; a rear wheel shock absorbing unit 103 arranged between each rear wheel 104 and the vehicle body; and a control unit 10. The control unit 10 includes: a vertical acceleration differential value measuring means 3 for measuring the differential value of an acceleration in a vertical direction which is higher than a predetermined level; first damping force and spring constant setting means 5 for setting a damping force and a spring constant according to the output of the measuring means 3; period measuring means 4 for measuring the period of vibration of the vehicle body from a signal representing a vertical acceleration; second damping force and spring constant setting means 6 for setting a damping force and a spring constant according to the output of the measuring means 4; and damping force and spring constant deciding means 7. The suspension control device further comprises: front wheel spring constant and damping force changing means 8; and rear wheel spring constant and damping force changing means 9.

Figure 2:
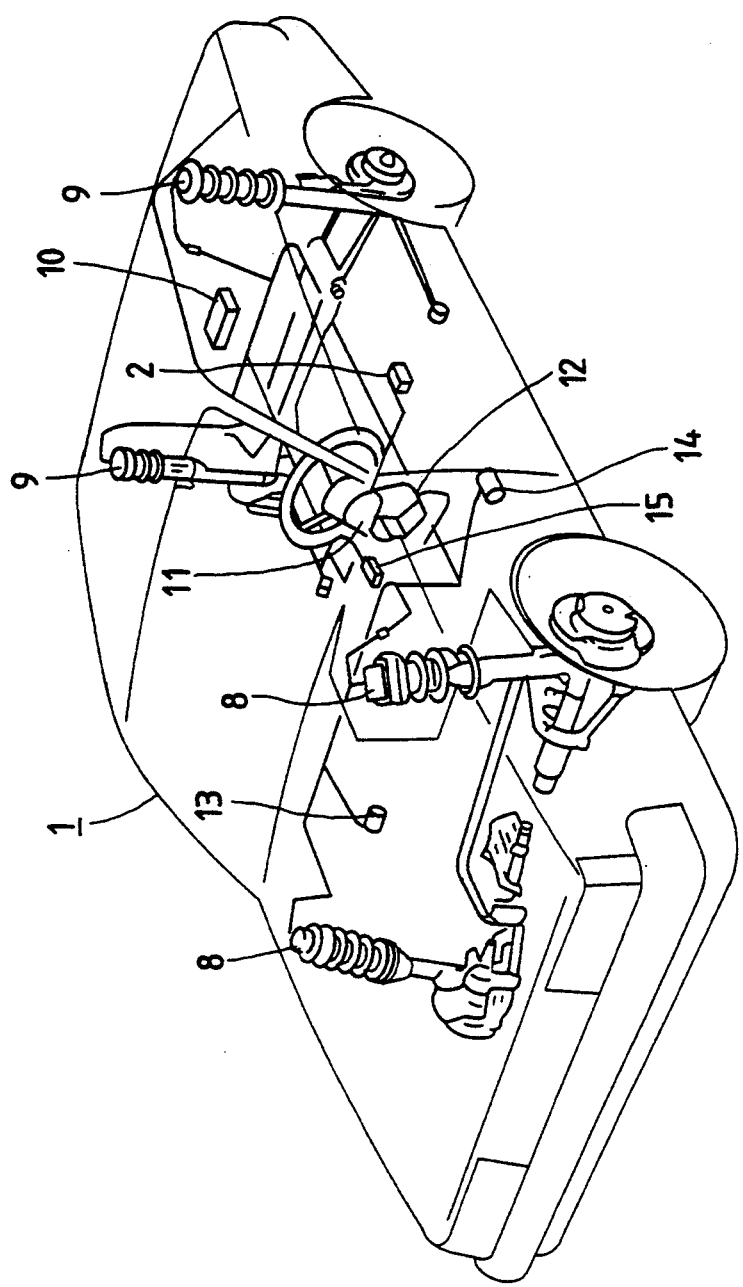
FIG. 2 is a perspective view showing components of the suspension control device which are installed on a vehicle.
Figure 3:
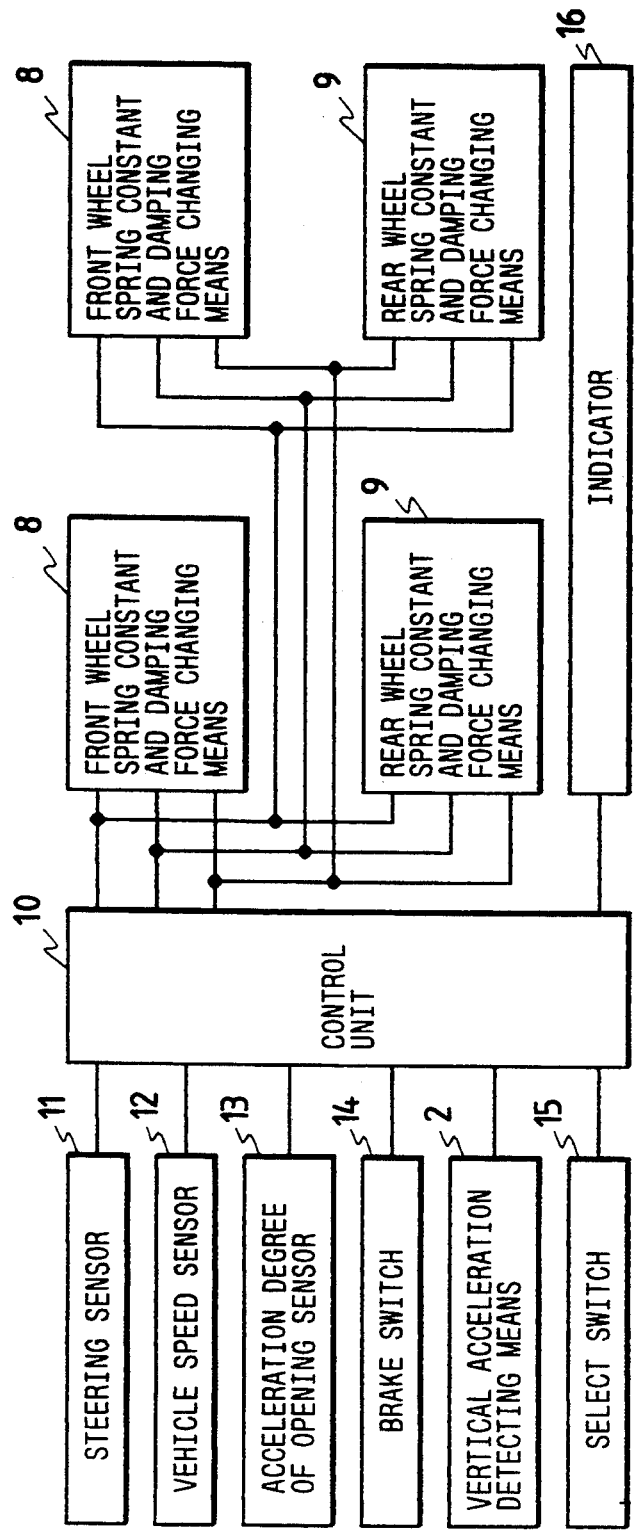
FIG. 3 is a block diagram showing a control unit in the suspension control device.

As shown in FIGS. 2 and/or 3, the vehicle body 1 has a steering sensor 11 for detecting the operation of a steering wheel, vehicle speed detecting means, namely, a vehicle speed sensor 12, an accelerator degree-of-opening sensor 13 for detecting the operation of accelerating and decelerating the vehicle body 1, a brake switch 14, a select switch 15, and an indicator 16.

The outputs of the steering sensor 11, the vehicle speed sensor 12, the accelerator degree-of-opening sensor 13, the brake switch 14 and the select switch 15 are applied to the control unit 10, which controls the indicator 16 and the damping force changing means 8 and 9.

The acceleration detecting means 2 is a vertical acceleration sensor for detecting an acceleration of the vehicle body in a vertical direction (hereinafter referred to as "a vertical G sensor 2", when applicable). The sensor may be an acceleration pickup using a piezo-electric element, or it may be an acceleration sensor of differential transformer type, or a vehicle acceleration sensor of semiconductor distortion gauge type.

In the embodiment, the vertical G sensor 2 is mounted on the vehicle body at the center of gravity; however, the invention is not limited thereto or thereby. That is, the sensor 2 may be mounted on the front of the vehicle body; or two sensors 2 may be mounted on the front and rear of the vehicle body, respectively; or it may be set at each of the suspensions of the wheels.

Figure 6:
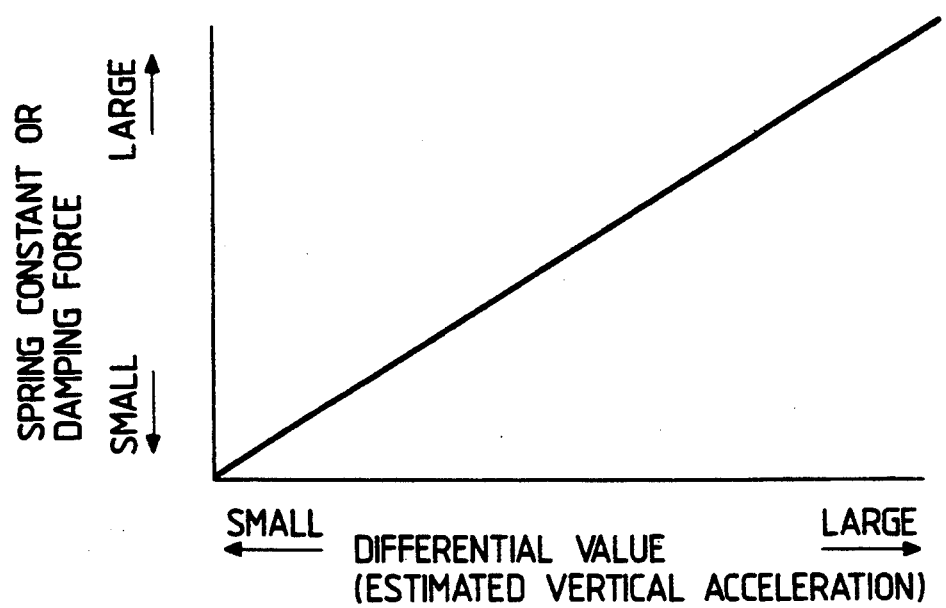
FIG. 6 is a graphical representation indicating differential value with spring constant or damping force for a description of the operation of the suspension control device.
Figure 7:
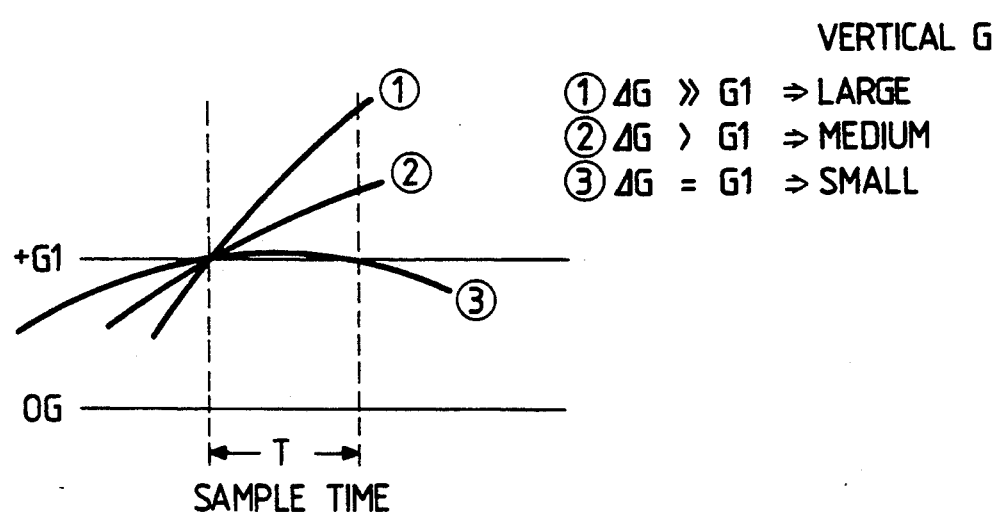
FIG. 7 is a waveform diagram showing differential values for a description of the operation of the suspension control device.
Figure 8:
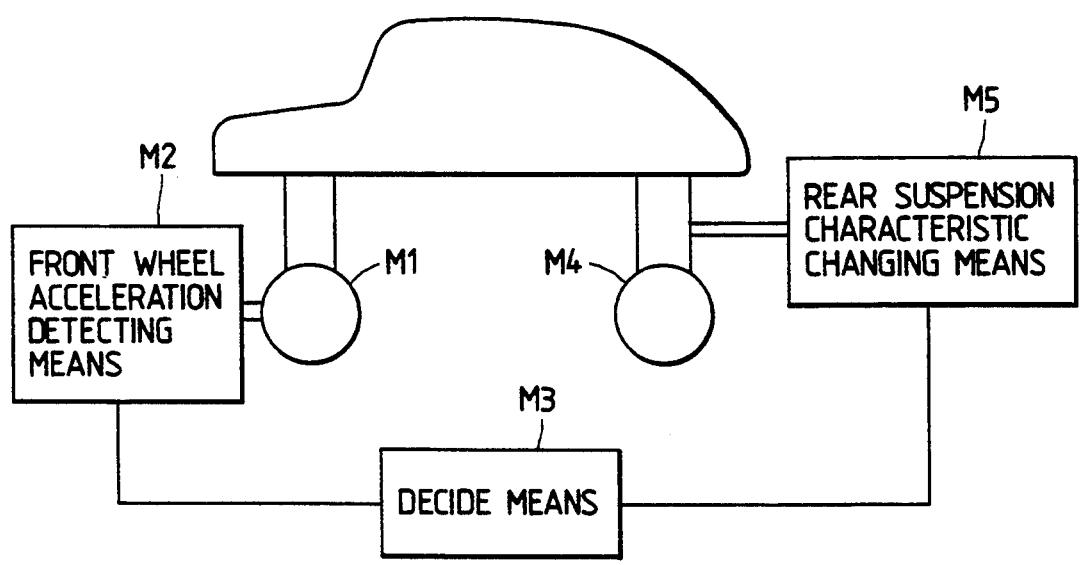
FIG. 8 is an explanatory diagram showing the arrangement of a conventional suspension control device.

The vertical G sensor 2 linearly outputs a vertical acceleration, with the output level of which represents a reference value at the time of zero acceleration. The output of the vertical G sensor is converted into a digital signal, which is applied to the control unit 10 comprising a microcomputer, so that the signal level variation of the vertical G sensor 2, the acceleration differential value, and the vibration period are subjected to operation. FIG. 6 indicates spring constants or damping forces with differential values in the suspension control device. The differential value of a vertical acceleration higher than a predetermined level as used herein is intended to mean the magnitude of a vertical acceleration estimate. It can be predicted that the vertical acceleration detected is proportional to the differential value, as shown in FIG. 7. That is, as the differential value increases, the spring constant or damping force is increased.

Figure 4:
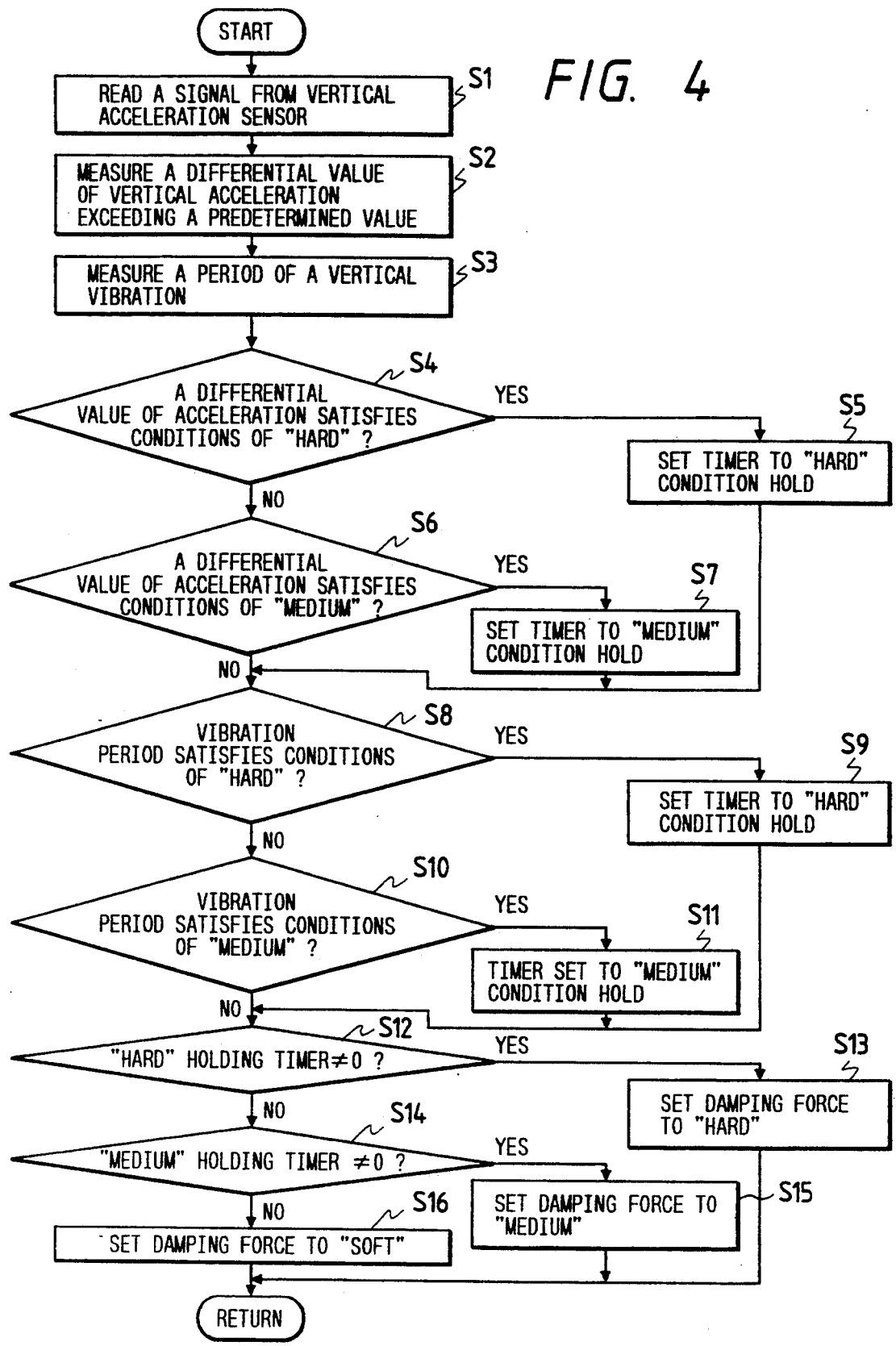
FIG. 4 is a flow chart for a description of the operation of the suspension control device.

The operation of the control unit 10 will be described with reference to a flow chart of FIG. 4 and an output waveform of the vertical G sensor 2 shown in FIG. 5.

Figure 5:
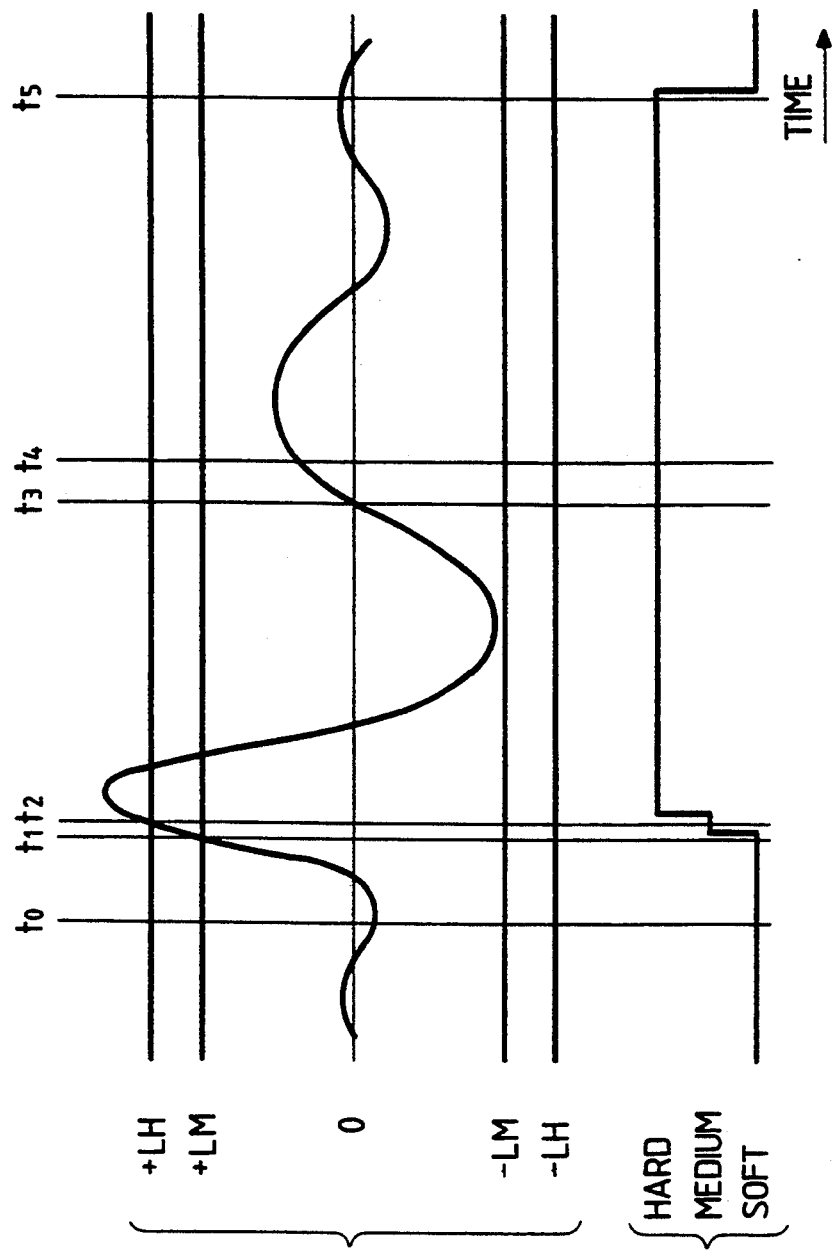
FIG. 5 is a waveform diagram showing vertical vibrations of a vehicle body with time, for a description of the operation of the suspension control device.

The part (a) of FIG. 5 shows an output waveform provided by the vertical G sensor 2 when the vehicle body 1 is periodically vibrated after moving over a large protrusion; and the part (b) of FIG. 5 shows one example of the control of the damping force in the same case.

At the time instant $t_0$, the front wheel is about to climb over the protrusion. In FIG. 4, in Step S1, the output of the vertical G sensor 2 is read, and in Step S2, the differential value of the output level of the vertical G sensor 2 is measured which exceeds each of predetermined values LH and LM set by the vertical acceleration differential value measuring means 3. Next, in Step S3, the period of vibration of the vehicle body 1 is measured from the output of the vertical G sensor 2 by the period measuring means 4.

At the time instant $t_0$, no differential value is detected which is higher than each of predetermined values LH and LM. Therefore, Steps S4 and S6 are effected in the first means 5, but processing for setting the damping force and spring constant proceeds directly to Step S8, where the second means 6 sets the damping force and spring constant. Furthermore, at the time instant $t_0$, no amplitude is detected which is larger than each of predetermined values LH and LM, and therefore Step S10 is effected in the second means 6 setting the damping force and spring constant, and S12 is effected in the means 7 deciding the damping force and spring constant. In Steps S12, S14 and S16 in the means 7 deciding the damping force and spring constant, hard, medium and soft conditions are determined for the front and rear wheels, to simultaneously set damping forces therefor.

At the time instant $t_1$, the control unit 10 operates as follows: In Step S1, the output signal of the vertical G sensor 1 is read. In Step S2, a differential value of the output level of the vertical G sensor 2 which is higher than a predetermined level is measured. In Step S3, the period of vibration of the vehicle body 1 is measured from the output of the vertical G sensor 2.

Thereafter, Step S4 is effected. At the time instant $t_1$, no differential value is detected which is higher than the predetermined value (LH), and therefore Step S6 is effected. In Step S6, it is determined that the differential value of the vertical acceleration exceeds (LM). Therefore, Step S7 is effected. In Step S7, a timer is set which is adapted to hold the damping forces of the front and rear wheels at a medium level. Thereafter, Step S8 is effected. At the time instant $t_1$, no period of vibration is detected which is larger than a desired value. Therefore, Steps S10 and S12 are effected. In Steps S12 through S16, the damping forces of the front and rear wheels are changed to medium settings as set in Step S7.

At the following time instant $t_2$, the control unit 10 operates as follows: Similarly as in the case of the time instant $t_1$, in Step S1 the signal of the vertical G sensor 2 is read, in Step S2 the differential value of the output level of the vertical G sensor 2 which is greater than a predetermined level is measured, and in Step S3 the period of vibration of the vehicle body 1 is measured from the output of the vertical G sensor 2. In the following Step S4, it is determined that, at the time instant $t_2$, the differential value of the vertical acceleration is larger than LH. Thereafter, Step S5 is effected.

In Step S5, a timer for holding the damping forces of the front and rear wheels at a hard level is set. Thereafter, Step S8 is effected; however, no period of vibration is detected which is larger than the desired value. Therefore, Step S10 is effected. In Steps S12 through S16, the damping forces of the front and rear wheels are changed to hard settings as set in Step S5.

At the time instant $t_3$, the vehicle body 1 moves over the protrusion, and is vibrated periodically. In this case, the control unit 10 operates as follows: In Step S1, the signal of the vertical acceleration sensor 2 is read. In Step S2, the differential values of levels greater than a predetermined level are measured. In Step S3, the period of vibration is measured. At the time instant $t_3$, the period is measured as a vibration larger than the desired value. Thereafter, Step S4 is effected. However, at the time instant $t_3$, no differential value is detected which is larger than each predetermined value (LH and LM) and higher than the desired value. Therefore, Steps S6 and S8 are effected.

When, at the time instant $t_3$, it is determined from the magnitude and period of vibration of the vehicle 1 that the vehicle body should be controlled in posture, then Step S9 is effected. In Step S9, a timer for holding the damping forces of the front and rear wheels at a hard level is set. Thereafter, Step S12 is effected. In Steps S12 through S16, the damping forces of the front and rear wheels are held at the hard level for a predetermined period of time, from $t_3$ to $t_5$, as set in Step S9.

Thus, suspension control has been achieved.

In the above-described embodiment, the damping force is changed in three steps; however, it goes without saying that the damping force may be changed in more than three steps, or it may be changed together with the spring constant.

As was described above, when the vehicle body moves over a large protrusion, the vertical acceleration detecting means positively detects the vibration of the vehicle body. When the differential value of the output of the vertical acceleration detecting means which is higher than the predetermined level is large enough, it can be detected earlier. Furthermore, the suspensions can be made hard according to the detection level (predetermined), with the result that the vehicle body is improved in controllability and in stability. In addition, by preventing the suspensions from being made excessively hard, the vehicle is kept comfortable to ride in. The presence of a large protrusion can be predicted from the predetermined level, which prevents the vehicle body from being damaged thereby.

When the vehicle body is periodically vibrated after moving over a protrusion, the vertical acceleration detecting means detects the vertical vibration of the vehicle body, to make the suspensions of the front and rear wheels hard, thereby to suppress the vibration of the vehicle body. Thus, with the suspension control device of the invention, the vehicle body is improved in controllability and in stability.

While there has been described in connection with the preferred embodiment of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A suspension control device comprising:
vertical acceleration detecting means for detecting an acceleration of a vehicle body in a vertical direction;
spring constant and damping force changing means for changing a setting of at least one of a spring constant and a damping force for a suspension of said vehicle body, said changing means simultaneously setting suspensions of front and rear wheels to a same one of plural levels;
vertical acceleration differential value measuring means for measuring a differential value of an output signal of said vertical acceleration detecting means;
vertical acceleration period measuring means for measuring a magnitude and period of vibration of an output signal of said vertical acceleration detecting means;
first damping force and spring constant holding and setting means for setting a first damping force and a first spring constant according to an output signal, which is larger than a predetermined level, of said vertical acceleration differential value measuring means;
second damping force and spring constant holding and setting means for setting a second damping force and a second spring constant according to an output signal of said vertical acceleration period measuring means; and a spring constant and damping force changing control unit which, in accordance with outputs of said first and second damping force and spring constant holding and setting means, changes outputs of said spring constant and damping force changing means to a same desired level simultaneously for front and rear wheels, and maintains said outputs at said desired level for a predetermined period of time.

2. A suspension control device according to claim 1, wherein said vertical acceleration detecting means is mounted on at least one portion of the center, front and rear of said vehicle body.

3. A suspension control device according to claim 1, wherein said vertical acceleration detecting means is mounted on each suspension of said vehicle body.

4. A suspension control device according to claim 1, wherein said spring constant and damping force changing control unit comprises timers for said predetermined period of time corresponding to said levels for at least one of said spring constant and damping force, in which said each timer is started when the respective levels are selected.

* * * * *